United States Patent Office 3,694,386
Patented Sept. 26, 1972

3,694,386
POLYURETHANE FOAMS PREPARED FROM 2,4-BIS(4 - ISOCYANATOCYCLOHEXYLMETHYL)-CYCLOHEXYL ISOCYANATE
Guenther Kurt Hoeschele, Wilmington, Del., assignor to E. I. du Pont de Nemours and Company, Wilmington, Del.
No Drawing. Continuation-in-part of application Ser. No. 741,847, July 2, 1968. This application Sept. 17, 1970, Ser. No. 73,234
Int. Cl. C08g 22/44, 22/24, 22/28
U.S. Cl. 260—2.5 AT    11 Claims

ABSTRACT OF THE DISCLOSURE

Polyurethanes prepared by reacting the triisocyanate, 2,4 - bis(4 - isocyanatocyclohexylmethyl)cyclohexyl isocyanate, with at least one active-hydrogen containing compound. The polyurethanes include coatings, foams, adhesives and elastomers. The coatings dry rapidly to a tack-free state and are particularly resistant to weather exposure. The foams generally have improved compression set compared with foams prepared from conventional polyisocyanates. Overall, the polyurethane formulations of this invention exhibit particularly convenient pot lives.

RELATED APPLICATION

This application is a continuation-in-part of copending application Ser. No. 741,847 filed July 2, 1968, and now U.S. Pat. 3,557,180.

BACKGROUND OF THE INVENTION

Polyisocyanates are highly useful compounds which have gained wide acceptance as starting materials for the manufacture of useful products such as foams and coating materials. The isocyanates most extensively used are the aromatic diisocyanates such as 2,4 - tolylene diisocyanate (or a mixture thereof with 2,6-tolylene diisocyanate) and 4,4'-methylenebis (phenyl isocyanate), or crude mixtures containing the above isocyanates and various by-products produced during the manufacture of the isocyanates.

Polymers prepared from aromatic polyisocyanates have a tendency to discolor on aging. For applications in which discoloration is undesirable, a non-discoloring aliphatic isocyanate can be used. Examples of known aliphatic polyisocyanates are 1,6-hexamethylene diisocyanate, 4,4'-methylenebis(cyclohexyl isocyanate) and 1,3-cyclohexylene diisocyanate.

Although many of the known aliphatic isocyanates are more or less suitable for use in preparing products such as polyurethane coatings and foams, there is a need for an aliphatic isocyanate which has a functionality (isocyanato groups per molecule) greater than two. Isocyanates having a higher functionality generally yield faster curing coatings which are tougher and more stable against outdoor exposure and certain solvents than coatings prepared from lower-functional isocyanates. Foams prepared from higher functional isocyanates generally develop gel strength more rapidly and manifest improved compression set. Other highly desirable attributes of any isocyanate are low volatility (and thus low toxicity) and liquidity at normal operating temperatures for ease of storage and handling. Few, if any, of the known aliphatic isocyanates combine all these desirable attributes.

SUMMARY OF THE INVENTION

According to this invention, polyurethanes are prepared by reacting 2,4 - bis(4 - isocyanato - cyclohexylmethyl) cyclohexyl isocyanate and at least one active-hydrogen contained compound containing two or more active hydrogens.

DETAILED DESCRIPTION

The triisocyanate used to make the polyurethanes of this invention corresponds to the following structural formula:

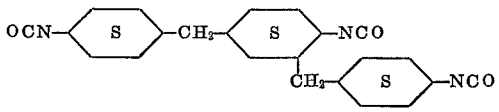

The substantially pure compound, hereinafter also called "triisocyanate," is a liquid at room temperature which boils at about 240° C. at a pressure of 0.35 mm. Hg. The triisocyanate can be prepared by phosgenating the corresponding triamine, 2,4 - bis(4 - aminocyclohexylmethyl) - cyclohexylamine, hereinafter also called "triamine." The triamine corresponds to the above-identified triisocyanate formula except the isocyanato groups are replaced by amino groups. The triamine is a viscous liquid boiling at about 198° C. at 1 mm. Hg.

The starting material for the triamine is the corresponding aromatic triamine. The aromatic triamine is prepared by condensing aniline and formaldehyde by the procedure disclosed in the following representative references: U.S. Pats. 2,818,433, 2,974,168 and 3,163,666. Aniline and formaldehyde are reacted in the presence of a mineral acid. Hydrochloric acid is preferred, although other mineral acids, such as sulfuric acid, can be used. While the exact amount of acid to be used is not particularly critical, the practical range is between about 0.4 and 2 moles per equivalent of amine. The preferred range is about 0.8–1.0 mole per equivalent of amine. The mineral acid will, of course, form salts with the amines present and it is to be understood that the term "mineral acid" is meant to include salts of the acid with the amine. Also, the aniline which reacts with formaldehyde can be present as the free amine or as a salt of the mineral acid.

As is well known, the condensation of aniline and formaldehyde as described above produces a mixture of methylene-bridged polyphenylene polyamines which include 4,4' - methylenedianiline (MDA), 2,4-bis(4-aminobenzyl)aniline (the desired aromatic triamine starting material) and related higher polyamines. The relative proportions of these amines in the reaction product depends on the ratio of aniline to formaldehyde used. In order to maximize the yield of aromatic triamine, the aniline-formaldehyde ratio should be at least 2.0:1 and preferably about 2.8–3.0:1, though higher and lower amine/formaldehyde ratios can be used.

After the reaction is complete, unreacted aniline and methylenedianiline are removed by distillation, and the crude 2,4-bis(4-aminobenzyl)aniline is further purified by distillation. The aromatic rings of the triamine are then hydrogenated by conventional procedures, illustrative of which is the method described in U.S. Pat. 2,606,925. A preferred method is to hydrogenate the triamine in a solution of dioxane and anhydrous ammonia using as a catalyst ruthenium on finely divided alumina. The foregoing mixture is charged to a reactor which is then pressured with hydrogen to about 5000 p.s.i.g. The reaction is carried out at about 210° C. for about one hour with agitation. Alternatively, the distillation residue remaining after removal of MDA can be hydrogenated directly without isolation of the aromatic triamine, and the cycloaliphatic triamine can then be isolated from the mixture of hydrogenated materials. The ring hydrogenation of the aromatic triamine proceeds smoothly to high yields of the aliphatic triamine substantially free of aromatic amines.

The cycloaliphatic triamine is a complicated mixture of various possible stereoisomers. The related diamine, 4,4'-methylenebis(cyclohexylamine), exists in three stereoisomeric forms, and the presence in the compound of the third aminocyclohexyl group increases the number of possible stereoisomers to sixteen. The ratio of the various stereoisomeric forms will vary to a considerable extent with the exact conditions used in carrying out the hydrogenation. For discussion of the variation of stereoisomeric forms of the diamine see U.S. Pat. 2,494,563, column 1.

To obtain the corresponding triisocyanate, the triamine is phosgenated using conventional methods such as those described in U.S. Pats. 2,818,433, 2,974,168, 3,163,666 and 3,367,969. A preferred phosgenation method is to dissolve the aliphatic triamine in o-dichlorobenzene, saturate the resulting solution with anhydrous hydrochloric acid at about 110–120° C. and then add phosgene to the resulting slurry at about 165° C. for about 2 hours. The conversion of the triamine to the triisocyanate does not affect the structural configuration and therefore the isomeric ratio of the triamine is substantially carried over to the isocyanate.

The triisocyanate and its mixtures with other aliphatic polyisocyanates, particularly 4,4' - methylenebis(cyclohexyl isocyanate) can be reacted with at least one active-hydrogen containing compound containing two or more active hydrogens, i.e., polyols, polyamines and water, to prepare non-discoloring coatings, elastomers, adhesives and flexible foams by methods well known in the art. By "elastomers" is meant solid elastomeric products other than foams such as cast, molded and extruded articles. In coating and adhesive formulations, the triisocyanate can be used to replace trifunctional aromatic isocyanate components. The inherently lower reactivity of aliphatic isocyanates can be compensated by the use of catalysts. Organotins such as dibutyl tin dilaurate and stannous octoate are excellent catalysts for the polyol-isocyanate reaction. Tetramethylguanidine, pentaalkylguanidines such as 2-dodecyl-1,1,3,3-tetramethylguanidine and bicyclic amidines such as 1,5-diazabicyclo [4.3.0]-nonene-5 are preferred catalysts for the reaction of aliphatic isocyanates with water. In preparing solid polyurethane elastomers, the use of triisocyanate in admixture with diisocyanates permits control of the cross-link density in cured products. In preparing non-discoloring flexible foams, the triisocyanate is preferably used in admixture with an aliphatic diisocyanate. While flexible foams can be prepared from such mixtures by a one-shot procedure (simultaneous reaction of the foam-forming ingredients), prepolymer and quasi-prepolymer procedures (stepwise reaction of the foam-forming ingredients) are preferred because of the relatively low reactivity of aliphatic isocyanates.

When the triisocyanate is used in combination with other polyisocyanates in making polyurethanes of this invention, it is generally present in amounts sufficient to provide at least about 5% as many equivalents of isocyanato groups as are provided by the other polyisocyanate(s).

The usual polyether and polyester polyols can be employed in preparing coatings, adhesives, elastomers and foams based wholly or partially on the triisocyanate; however, polyesters are often preferred because of their greater resistance to oxidation which complements the non-discoloring characteristics of the aliphatic isocyanates. Representative polyols useful in this invention are polyalkyleneether glycols such as polyethyleneether glycol, polypropyleneether glycol and polytetramethyleneether glycol and the polyethers prepared by the copolymerization of cyclic ethers such as ethylene oxide, propylene oxide, trimethylene oxide and tetrahydrofuran with aliphatic polyols such as ethylene glycol 1,3-butanediol, glycerol and sorbitol; polyester glycols prepared by the polymerization of cyclic lactones such as ε-caprolactone or by the condensation polymerization of a dicarboxylic acid and a molar excess of an organic polyol, representative diacids being succinic, glutaric and adipic acids and representative organic polyols being ethylene glycol, propylene glycol, 1,3-butanediol and 1,4-butanediol.

It is also possible to employ as at least part of the polyol component, an aliphatic polyol having a low molecular weight such as ethylene glycol, 1,4-butanediol, trimethylol propane and glycerol. Polyamines such as methylenedianiline, m-tolylene diamine, 4,4'-methylenebis(o-chloroaniline), hexamethylenediamine and the crude methylene bridged polyarylene polyamines prepared by condensing aromatic diamines and formaldehyde can also be used as part of the active hydrogen containing compounds. Other representative polyols are given in U.S. Pat. 3,248,373 to Barringer. Detailed information on formulations and procedures for preparing representative urethane coatings, elastomers, adhesives and flexible foams can be found in Chapters VII, IX, X and XI of "Polyurethanes: Chemistry and Technology, Part II," Saunders and Frisch, Interscience Publishers (1964).

Typical elastomers can be prepared by reacting one mole of a polyether or polyester glycol having a molecular weight of about 600 to 2000 with about 1.4 to 2.5 moles of an aliphatic diisocyanate to form a prepolymer to which is added about 0.1 to 1.0 moles of the triisocyanate of this invention. Curing can be accomplished by mixing the prepolymer plus triisocyanate with about an equivalent amount of an aromatic diamine such as methylene dianiline, m-tolylene diamine or 4,4'-methylenebis-(o-chloroaniline) or a low molecular weight diol such as butanediol-1,4, 1,4-cyclohexanedimethanol or diethylene glycol. When diols are used as curing agents, the elastomers can be readily prepared by one-shot procedures as well as prepolymer procedures.

Typical moisture cure coatings can be prepared by reacting about 1.6–2.0 equivalents of an aliphatic polyisocyanate with 1 equivalent of a polyether or polyester glycol having a molecular weight of about 200–1000. The required aliphatic polyisocyanate can be the triisocyanate of this invention used alone or used in admixture with aliphatic diisocyanates. The resulting reaction product when mixed with conventional coating solvents and curing catalysts can be applied by spraying, brushing or dipping and will cure in air. Two part coatings can be made in similar fashion, but cure is usually effected by adding about an equivalent amount of a low molecular weight diol to the solvent solution of the reaction product of polyisocyanate and glycol.

Flexible foams are preferably prepared by a quasi- or full-prepolymer procedure in which an excess of aliphatic diisocyanate is first reacted with a polyether or polyester diol and/or triol having an equivalent weight of about 500–1500. To this quasi- or full-prepolymer is added the triisocyanate of this invention in amounts equivalent to about 5–50% of the diisocyanate used in prepolymer preparation. By adding water (or in the case of quasi-prepolymer systems, water plus polyol) in amounts up to about equivalent to the available —NCO in the mixture of prepolymer and triisocyanate in the presence of suitable catalysts, the foam is formed. Rigid and semi-rigid foams can be similarly prepared by using polyols having lower equivalent weights and functionalities of at least about 3.

Adhesives can be prepared substantially by the procedures described above for preparing coatings. Addition of minor amounts of the triisocyanate to solution adhesives based on linear polyurethane elastomers such as that derived from 1 mole polytetramethyleneether glycol (1000 M.W.), 1 mole butanediol-1,4 and 2 moles of 4,4'-methylenebis(cyclohexyl isocyanate) increases bond strength in many applications.

Although the triisocyanate of this invention is usually used alone or in combination with aliphatic diisocyanates in making polyurethanes, it has been found that the triisocyanate can also be used advantageously with aromatic diisocyanates, such as the tolylene diisocyanates. The difference in reactivities of the triisocyanate and the aromatic diisocyanates allows the diisocyanate to chain extend and produce high molecular weight polymeric chains before the triisocyanate begins to react sufficiently to cross link and cause gellation. Such formulations have long pot lives and the resulting polyurethanes manifest outstanding thermal and hydrolytic stability. In making polyurethanes from mixtures of the triisocyanate and aromatic diisocyanates, the active hydrogen-containing compounds described above can be used in procedures well known in the art for making aromatic polyisocyanate-based urethane products.

The triamine is useful as an intermediate in the preparation of the triisocyanate. The triisocyanate is highly useful in the preparation of such materials as polyurethane coatings and foams as described above. It has the important advantage of being a liquid at room temperature and thus is conveniently handled and stored. The triisocyanate has extremely low volatility which is a significant factor with respect to safety to personnel handling the material. Because of the known structure of the triisocyanate, it provides a convenient means of controlling the average functionality of reactants to be used in polyurethane preparation. A further advantage of the triisocyanate is that it contains one isocyanato group which is less reactive than the other two (attached to the central carboxylic ring) which is important in certain applications where it is desired to leave some isocyanato groups available for further reaction, e.g., moisture-cured coatings.

The use of 2,4-bis(4-isocyanatocyclohexylmethyl)cyclohexyl isocyanate in making polyurethanes according to this invention provides many advantages. The polyurethane coatings dry rapidly to a tack-free state and are particularly resistant to weather exposure. The foams generally have significantly improved compression set over foams prepared from conventional polyisocyanates. Overall, the polyurethane formulations of this invention have especially convenient pot lives.

This invention will be further illustrated by the following examples wherein parts and percentages are by weight unless otherwise indicated.

EXAMPLE 1

(a) Preparation of 2,4-bis(p-aminobenzyl)aniline

Aniline and formaldehyde are reacted in the presence of hydrochloric acid using molar ratios of aniline to formaldehyde of about 3:1 and aniline to HCl of about 0.92:1. The reaction is carried out first at 20–42° C. and then continued at about 65° C. for about 4 hours. The reaction mass is added to aqueous sodium hydroxide to neutralize the amine hydrochloride. The aqueous and organic phases are separated, and unreacted aniline is distilled off leaving a crude reaction mass containing about 85.7% 4,4'-methylenedianiline. 3346 grams of this crude product are distilled at a pressure of 0.5 mm. Hg to remove most of the methylenedianiline, leaving a residue of 477 g. 467 grams of this residue are transferred to a smaller flask and distillation is continued. After discarding 37 g. of a forerun, a total of 335 g. of distillate is collected (pot temperature of 290–340° C. at 0.5 mm. Hg) and 92.5 grams of residue remain in the flask. The distillate is recrystallized twice from toluene, and the product is further purified by continuous extraction with n-hexane for 4 hours to remove any trace of methylenedianiline. The purified compound, 2,4-bis(p-aminobenzyl)aniline, melts at 133–135° C.

Analyses for amino nitrogen show the following— Calculated for $C_{20}H_{21}N_3$ (percent): 13.85. Found (percent): 13.7, 13.9.

(b) Preparation of 2,4-bis(aminocyclohexylmethyl)cyclohexylamine

The compound prepared in paragraph (a) above is hydrogenated as follows:

A mixture of 100 ml. of dioxane, 50 g. of anhydrous ammonia, 15 g. of catalyst comprising 5% ruthenium on finely divided alumina, and 100 g. of 2,4-bis(p-aminobenzyl)aniline is hydrogenated in a reactor pressured with hydrogen at 5000 p.s.i.g. at 210° C. for one hour, with agitation. The reactor is cooled and vented, and the product is rinsed from the reactor with dioxane. The dioxane solution is freed of catalyst by filtration and is distilled to yield 2,4 - bis(4 - cyclohexylmethyl)cyclohexylamine boiling at 198° C./1 mm. Hg. The product is a clear, colorless syrup. The distilled triamine has an amine equivalent weight as determined by titration with standard acid solution, of 107.7 (calculated, 107.2) and is substantially free of aromatic material, as shown by ultraviolet analysis.

Analyses show the following: Calculated for $C_{20}H_{39}N_3$ (percent): C, 74.7; H, 12.23; N, 13.06; mol. weight, 321.5. Found (percent): C, 73.7; H, 12.2; N, 12.8; mol. weight (cryoscopic in benzene) 331, 335.

(c) Preparation of 2,4-bis(4-isocyanatocyclohexylmethyl)cyclohexyl isocyanate

A solution of 30 g. of the triamine prepared as described in (b), dissolved in 310 g. of dry o-dichlorobenzene, is saturated with anhydrous hydrochloric acid at 110–120° C. with efficient agitation. Phosgene is added to the resulting slurry at 165° C. for about 2 hours until a homogeneous reaction mixture is obtained. The charge is swept with nitrogen to remove phosgene, and the solvent is distilled off under reduced pressure (20 mm. Hg) and finally at 120° C. and 0.5 mm. Hg. The crude phosgenation product (35.4 g.) is purified by continuous extraction with petroleum ether (boiling range 30–60° C.). About 1 g. of the crude material is insoluble in petroleum ether and discarded. The extracted product is freed of solvent by distillation yielding an almost colorless viscous liquid.

Analyses show the following:

|  | Calc. for $C_{23}H_{33}N_3O_3$ | Found | |
| --- | --- | --- | --- |
| Molecular weight (cryoscopic method in benzene) | 399.5 | 399 | 407 |
| C, percent | 69.2 | 68.6 | 68.5 |
| H, percent | 8.33 | 8.4 | 8.3 |
| N, percent | 10.52 | 10.5 | 10.4 |
| NCO, percent (ASTM D-1638-60T) | 31.55 | 30.95 | |

The structure of the 2,4-bis(4-isocyanatocyclohexylmethyl)cyclohexyl isocyanate is confirmed by nuclear magnetic resonance and infrared spectroscopy.

EXAMPLE 2

Crude methylenedianiline, prepared as described in Example 1, is distilled at reduced pressure to remove methylenedianiline. The residue comprising 2,4-bis(p-aminobenzyl)aniline and minor amounts of higher polyamines is hydrogenated by the procedure described in Example 1. The aliphatic triamine is isolated from the reduction mass by fractional distillation at 1 mm. Hg in a spinning band column. About 70 parts of triamine, substantially identical to that prepared in Example 1, is obtained for each 100 parts of starting residue. The distilled triamine is phosgenated according to the procedure of Example 1. The product, after extraction with petroleum ether, is obtained with about 90% yield based on the aliphatic triamine as a slightly yellowish clear liquid having an isocyanate content of 30.65%. A purer and completely colorless product is obtained by distillation in a falling film molecular distillation apparatus (6 inches of heated column, mean free path 2 mm.) at a pressure of 1 micron at a column temperature of 125–130° C.[1]

[1] The distillation apparatus used is described in "Review of Scientific Instruments", vol. 31, No. 9, pgs. 1002–1004, (1960).

Analyses show the following:

| | Calc. | Found | |
|---|---|---|---|
| Molecular weight (vapor phase osmometry in benzene) | 399.5 | 400 | |
| C, percent | 69.2 | 69.1 | 69.2 |
| H, percent | 8.33 | 8.3 | 8.4 |
| N, percent | 10.52 | 10.3 | 10.3 |
| NCO, percent (ASTM D-1638-60T) | 31.55 | 31.1 | |

EXAMPLE 3

A prepolymer is prepared by mixing 80 parts of a polyester triol having an equivalent weight of about 1000 (obtained by esterification of adipic acid with a mixture of diethylene glycol and trimethylolpropane) with 58 parts of a liquid mixture of stereoisomers of 4,4'-methylenebis(cyclohexyl isocyanate) containing about 20% trans-trans isomer, 65% cis-trans isomer and 15% cis-cis isomer at room temperature and heating the resulting mixture for 20 hours at 67° C. The resulting prepolymer has an isocyanato group assay of 10.6%.

Foam A—A non-discoloring flexible foam is prepared from this prepolymer by a batchwise quasi-prepolymer procedure employing the following formulation.

| | Parts |
|---|---|
| Prepolymer | 130.0 |
| Triisocyanate of Example II | 22.0 |
| Polyester triol described in this example | 23.6 |
| N,N-Dimethylformamide | 9.5 |
| Methylene chloride | 8.0 |
| Silicone surfactant for flexible polyester foams sold by Union Carbide as "L-532". Described in "L-532, Silicone Surfactant for Polyester Urethane Formation", Product Information Bulletin, Union Carbide, 1966 | 1.5 |
| Water | 3.72 |
| Tetramethylguanidine | 4.0 |

The materials are added in the order shown at room temperature and the resulting mixture is agitated for about 12 seconds with a high-speed mixer and then poured into an open container and allowed to foam. The formulation requires about 150 seconds to reach maximum height. The foam does not exhibit any shrinkage and has uniform fine cells. It has a density of about 2.0 lbs./cu. ft. After aging for 20 hours at 120° C., the foam has a compression set of 27% by ASTM Method B (50% compression, 22 hours/70° C./30 minute recovery).

Foam B—A second foam is prepared by the same procedure with the exception that the 22.0 parts of triisocyanate is replaced with a chemically equivalent amount (34.3 parts by weight) of a 77% by weight solution of the trimer of 4,4'-methylenebis(cyclohexyl isocyanate) dissolved in 4,4'-methylenebis(cyclohexyl isocyanate). The isocyanate assay of the trimer solution is 19.7%. The trimer solution is prepared by heating 100 parts of the liquid 4,4'-methylenebis(cyclohexyl isocyanate) previously described in this example in the presence of 2 parts of 1,1,2,4,4,5,5-heptamethylisobiguanide at 60–70° C. until the isocyanate assay drops to the desired value and preventing further trimerization by the addition of 1 part of benzoyl chloride. Foam B reaches maximum height in about 120 seconds and does not exhibit any shrinkage. Its cell structure is somewhat coarser than that of Foam A. After aging for 20 hours at 120° C. the compression set of Foam B is 59, over twice the value found for Foam A by the same test method.

Foam C—A third foam is prepared by substantially the same procedure used for Foam A with the exception that the 22.0 parts of triisocyanate is replaced with a chemically equivalent amount (21.8 parts by weight) of the liquid 4,4'-methylenebis(cyclohexyl isocyanate) previously described in this example. Foam C rises to maximum height in about 130 seconds, does not shrink and has uniform fine cells. After 20 hours aging at 120° C. its compression set is about 60, again over twice that found for Foam A by the same test method.

EXAMPLE 4

(a) The triisocyanate product of Example 1 is mixed with an equal weight of the liquid 4,4'-methylenebis(cyclohexyl isocyanate) described in Example 3. The resulting mixture, which has an isocyanate content of 31.3%, is used to prepare a coating composition as follows:

54 parts of the mixture is mixed with 100 parts of a hydroxy-terminated polyester diol having an equivalent weight of 265 and a hydroxyl No. of about 205 (the diol is the reaction product of adipic acid and a mixture of ethylene glycol and propylene glycol containing 70 mole % ethylene glycol) and 154 parts of urethane grade percent ethylene glycol) and 154 parts of urethane grade butyl acetate. The NCO/OH ratio is 1:1. Dibutyl tin dilaurate is added (0.15 part). The resulting solution has a workable pot life of 16–20 hours. Films are cast for determination of properties. For the hardness test 3 mil. thick films are cast on glass. For the evaluation of abrasion resistance and tensile properties wet films 20 mil thick are cast on a "Mylar" [poly(ethylene terephthalate)] film. Cures are at room temperature for the time shown in the table.

TABLE

Hardness (determined by Sward Rocker [1])

| Cure | Sward reading |
|---|---|
| 1 day | 4 |
| 5 days | 24 |
| 10 days | 28 |

[1] For a discussion of the Sward Hardness Rocker see Official Digest, Federation of Paint and Varnish Production Clubs, 26, 1030-8 (Nov. 1954). The apparatus is available from the Gardner Laboratory, Inc., Bethesda, Md.

Abrasion resistance (determined by means of a Taber Abraser, CS-17 wheel, 1,000 g. wt.)

| Cure | Weight loss per 1,000 revolutions, mg. |
|---|---|
| 1 week | 115 |
| 1 month | 86 |

Stress strain properties (measured by ASTM Method D 412-62T)

| Cure | Tensile strength at break, p.s.i. | Elongation at break, percent |
|---|---|---|
| 1 week | 3,500 | 120 |
| 1 month | 5,150 | 110 |

(b) When the above experiment is repeated using as the isocyanate component 53 parts of the liquid 4,4'-methylenebis(cyclohexyl isocyanate) described in Example 3, the solution has a workable pot life of 4 days. Cast films take about 7–8 days to dry to a tack-free state as opposed to less than 1 day for the films of part (a). The films are so soft that they have a Sward hardness of only 4 after 10 days and are not suitable for the determination of stress-strain data.

(c) When films are prepared as in part (a) except using the triisocyanate as the only isocyanate component and the same stoichiometric proportion of the polyester, the solution has a somewhat shorter pot life. The films prepared are harder and more resistant to weather exposure than those of part (a).

What is claimed is:

1. A polyurethane prepared by reacting a polyisocyanate with at least one active hydrogen-containing compound containing at least two active hydrogens, wherein the polyisocyanate is 2,4-bis(4-isocyanatocyclohexylmethyl) cyclohexyl isocyanate alone or in combination with at least one other polyisocyanate, with the proviso that said 2,4-bis-(4-isocyanatocyclohexylmethyl) cyclohexyl isocyanate is present in an amount sufficient to provide at least about 5% as many equivalents of isocyanato groups as are provided by said other polyisocyanate.

2. A polyurethane of claim 1 wherein the 2,4-bis(4-isocyanatocyclohexylmethyl)cyclohexyl isocyanate is used in combination with at least one other aliphatic polyisocyanate.

3. A polyurethane of claim 1 wherein the 2,4-bis(4-isocyanatocyclohexylmethyl)cyclohexyl isocyanate is used in combination with 4,4'-methylenebis(cyclohexyl isocyanate).

4. A polyurethane of claim 1 wherein the 2,4-bis(4-isocyanatocyclohexylmethyl)cyclohexyl isocyanate is used in combination with an aromatic diisocyanate.

5. A composition of claim 1 wherein the polyurethane is an elastomer.

6. The polyurethane of claim 5 wherein the polyisocyanate component consists essentially of:
    (a) 0.1–1.0 moles of 2,4-bis(4-isocyanatocyclohexylmethyl)cyclohexyl isocyanate and
    (b) a prepolymer prepared by mixing about one mole of a polyether or polyester glycol having a molecular weight of about 600–2000 with about 1.4–2.5 moles of an aliphatic diisocyanate
and said active hydrogen-containing compound is at least one of aromatic diamine or a glycol having a molecular weight below about 350 in an amount sufficient to react with approximately all of the free isocyanato groups.

7. The polyurethane of claim 6 wherein the aliphatic diisocyanate is 4,4'-methylenebis(cyclohexyl isocyanate).

8. The polyurethane of claim 1 wherein an excess of isocyanator groups over active hydrogens are present and said hydrogen-containing compound is at least one of a polyether or polyester glycol, said polyurethane being capable of undergoing a moisture-cure.

9. A moisture-cured polyurethane coating composition prepared by:
    (a) reacting
        (1) 1.6–2.0 equivalents of isocyanato groups wherein at least about 5% of the isocyanato groups are provided by 2,4-bis(4-isocyanatocyclohexylmethyl)cyclohexyl isocyanate, and
        (2) one equivalent of a polyether or polyester glycol having a molecular weight of about 200–1000 to form a prepolymer,
    (b) adding a catalyst which promotes the aliphatic isocyanate-water reactions and
    (c) moisture-curing the prepolymer.

10. A polyurethane foam composition prepared by
    (a) reacting
        (1) an excess of an aliphatic diisocyanate and
        (2) at least one of an aliphatic diol or triol having an equivalent weight of about 500–1000 to form a prepolymer,
    (b) mixing the prepolymer of part (a) with an amount of 2,4-bis(4-isocyanatocyclohexylmethyl)cyclohexyl isocyanate which provides about 5–50% of the equivalents of isocyanato groups provided by said aliphatic diisocyanate, and
    (c) adding sufficient water or water plus polyol to react with the excess isocyanato groups.

11. A composition of claim 1 wherein the aliphatic diisocyanate is 4,4'-methylenebis(cyclohexyl isocyanate).

References Cited

UNITED STATES PATENTS

| | | | |
|---|---|---|---|
| 3,277,173 | 10/1966 | Powers et al. | 260—570 |
| 3,330,850 | 7/1967 | Campbell et al. | 260—453 |
| 3,401,190 | 9/1968 | Schmitt et al. | 260—453 |
| 3,454,505 | 7/1969 | Cross et al. | 260—2.5 |
| 3,456,037 | 7/1969 | Hoeschele | 260—858 |
| 2,683,730 | 7/1954 | Seeger et al. | 260—453 |

OTHER REFERENCES

Soviet Inventions Illustrated, March 1966, p. 9, at No. 172828.

DONALD E. CZAJA, Primary Examiner

H. S. COCKERAM, Assistant Examiner

U.S. Cl. X.R.

260—75 NT, 77.5 AT